United States Patent
Honda

(10) Patent No.: US 7,318,776 B2
(45) Date of Patent: Jan. 15, 2008

(54) TORQUE LIMITER

(75) Inventor: Masaaki Honda, Kuwana (JP)

(73) Assignee: NTN Corporation, Osaka (JP)

( * ) Notice: Subject to any disclaimer, the term of this patent is extended or adjusted under 35 U.S.C. 154(b) by 229 days.

(21) Appl. No.: 11/132,263

(22) Filed: May 19, 2005

(65) Prior Publication Data

US 2005/0261064 A1 Nov. 24, 2005

(30) Foreign Application Priority Data

May 24, 2004 (JP) ............... 2004-153007

(51) Int. Cl.
*F16D 7/02* (2006.01)
(52) U.S. Cl. ..................... 464/40; 192/56.2
(58) Field of Classification Search ............ 464/40, 464/57, 60; 192/56.2
See application file for complete search history.

(56) References Cited

U.S. PATENT DOCUMENTS 1,146,495 A * 7/1915 Hamel .................. 464/60
2,533,973 A * 12/1950 Starkey ................ 464/40

FOREIGN PATENT DOCUMENTS

| JP | 8-270673 | 10/1996 |
| JP | 10-110739 | 4/1998 |
| JP | 11-257368 | 9/1999 |

* cited by examiner

*Primary Examiner*—Greg Binda
(74) *Attorney, Agent, or Firm*—Wenderoth, Lind & Ponack, L.L.P.

(57) ABSTRACT

A spring-loaded torque limiter includes an annular outer member, an inner ring rotatably inserted in the annular outer member, a coil spring fitted on the radially outer surface of the inner ring, and a lid member fitted between the inner ring and the annular outer member, thereby closing a gap therebetween at one end of the annular outer member. The coil spring has a uniform diameter. The annular outer member has an axially inner end face formed with a protrusion adapted to engage one of the two end faces of the coil spring. The lid member has an axially inner surface formed with a protrusion adapted to engage the other end face of the coil spring.

2 Claims, 7 Drawing Sheets

TORQUE LIMITER

BACKGROUND OF THE INVENTION

The present invention relates to a spring-loaded torque limiter used for office machines such as printers and copiers, especially compact ones.

FIG. 8 shows a conventional spring-loaded torque limiter used for office machines (as disclosed in FIGS. 1 and 2 of JP patent publication 8-270673). It includes an annular outer member 31 having a boss portion 32 at one end thereof. An inner ring 33 is inserted in the annular outer member 31 and supported by the boss portion 32 so as to be rotatable relative to the annular outer member 31. A coil spring 34 is interference-fitted on the radially outer surface of the inner ring 33. A lid member 39 is fitted on the radially inner surface of the annular outer member 31 at the other end thereof to close a gap between the radially inner surface of the annular outer member 31 and the radially outer surface of the inner ring 33. The coil spring 34 comprises a large-diameter portion 34a and a small-diameter portion 34b interference-fitted on the radially outer surface of the inner ring 33. From the end of the small-diameter portion 34b, a hook 35 extends axially and engages the boss portion 32 of the annular outer member 31. From the end of the large-diameter portion 34a, a hook 36 extends axially and engages the lid member 39.

When the inner ring 33 is turned relative to the outer member 31 in the direction opposite to the direction in which the coil spring is wound as viewed from the right-hand side of FIG. 8, the small-diameter portion 34b is unwound slightly so that the turning resistance between the small-diameter portion 34b and the inner ring 33 decreases. Thus, torque greater than the turning resistance between the small-diameter portion 34b and the inner ring 33 is not transmitted between the inner ring 33 and the outer member 31. When the inner ring 33 is turned in the direction in which the coil spring is wound, the small-diameter portion 34b will be wound further tightly, so that the turning resistance between the small-diameter portion 34b and the inner ring 33 increases to such a level that the small-diameter portion 34b and the inner ring 33 are practically locked together. Thus, when the inner ring 33 is turned in the direction in which the coil spring is wound, the torque limiter loses its torque-limiting function. In order to adjust the turning resistance between the small-diameter portion 34b and the inner ring 33, which determines the maximum torque that can be transmitted between the inner ring 33 and the outer member 31, the lid member 39 is turned with the annular outer member 31 fixed to adjust the interference with which the small-diameter portion 34b is fitted on the inner ring 33.

The torque limiter 30 is mounted to a paper feed roller 37 of e.g. an office machine by coupling the end of the annular outer member 31 where there is the boss portion 32 to a roller body 38 of the roller 37. While the torque applied to the roller 37 is smaller than the set torque, the inner ring 33 and the roller 37 rotate together. If the torque applied to the roller 37 exceeds the set torque, the inner ring 33 slips, thus limiting transmission of torque.

Torque limiters including a coil spring having a uniform diameter are also known (see FIG. 1 of JP patent publication 10-110739 and FIGS. 1 and 2 of JP patent publication 11-257368). The coil spring disclosed in publication 10-110739 has at either end thereof a radially outwardly extending hook that engages the annular outer member. The coil spring disclosed in publication 11-257368 has an axially extending hook at one end thereof.

Because the coil spring 34 of the torque limiter 30 shown in FIG. 8, i.e. the torque limiter disclosed in JP patent publication 8-270673, includes the large-diameter portion 34a besides the small-diameter portion 34b to be interference-fitted on the inner ring 33, the torque limiter of FIG. 8 tends to be large in size. Since it is necessary to adjust the maximum torque that can be transmitted by turning the lid member 39, the cost for mass-production tends to be high. Because the coil spring of JP patent publication 10-110739 has the radially outwardly extending hooks, the annular outer member of the torque limiter disclosed in this publication has to have a correspondingly large diameter. Because the coil spring of JP patent publication 11-257368 has the axially outwardly extending hook, the annular outer member of the torque limiter disclosed in this publication tends to be large in axial length. Thus, the torque limiters disclosed in these publications tend to be large in size. Moreover, since the torque limiter disclosed in either publication has to be assembled so that the end faces engage the respective engaging portion formed on the annular outer member, productivity is low, and thus the production cost tends to be high.

An object of the present invention is to provide a torque limiter which is small in size and can be manufactured at a low cost.

SUMMARY OF THE INVENTION

According to the present invention, there is provided a torque limiter comprising an annular outer member having a boss portion at a first end thereof, an inner ring inserted in the annular outer member and supported by the boss portion so as to be rotatable relative to the annular outer member, a coil spring having a uniform diameter and interference-fitted on a radially outer surface of the inner ring, and a lid member fitted in the annular outer member at a second end thereof, thereby closing a gap between the radially outer surface of the inner ring and a radially inner surface of the annular outer member, the boss portion having an axially inner end face formed with a first protrusion configured to engage one of two end faces of the coil spring, the lid member having an axially inner surface formed with a second protrusion configured to engage the other of the two end faces of the coil spring.

When the inner ring rotates in one direction relative to the annular outer member, the coil spring will also rotate in this direction together with the spring, so that one of the end faces of the coil spring will separate from the protrusion of the lid member, while the other end face is pressed against the protrusion of the annular outer member. The coil spring is thus slightly expanded radially, so that the turning resistance between the inner ring and the coil spring decreases to a predetermined level. When the inner ring rotates in the opposite direction relative to the annular outer member, the coil spring will also rotate in this direction together with the inner ring, so that the other end face will separate from the protrusion of the annular outer member, while the one end face is pressed against the protrusion of the lid member. The coil spring is thus slightly expanded radially, so that the turning resistance between the inner ring and the coil spring decreases to a predetermined level. The torque limiter thus functions in either rotational direction.

The torque limiter may include a plurality of the coil springs which are equal in diameter and winding direction to each other and axially aligned with each other, with the axially outer end faces of the coil springs at both axial ends in engagement with the first and second protrusions, respectively, and each of the end faces of the coil springs other than the axially outer end faces being in abutment with a corresponding end face of an adjacent one of the coil springs.

The following are advantages of the present invention.

(1) Since the coil spring has a uniform diameter and includes no hook at either end thereof with the end faces thereof directly engaging the protrusions of the annular outer member and the lid member, respectively, the torque limiter is small in both radial and axial dimensions.

(2) The maximum torque that can be transmitted is determined by the interference with which the coil spring is fitted on the radially outer surface of the inner ring. That is, the maximum torque is determined simply by predetermining the interference with which the coil spring is mounted on the inner ring, and fitting the coil spring on the inner ring.

(3) When assembling the torque limiter, it is not necessary to adjust the angular positions of both ends of the coil spring relative to the protrusions of the annular outer member and the lid member. It is not necessary to adjust the maximum torque after assembly, either. This reduces production cost.

(4) Since the maximum torque values in both rotational directions are equal to each other, the torque limiter according to the present invention performs the same function as two unidirectional torque limiters combined with a smaller number of parts.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1A:
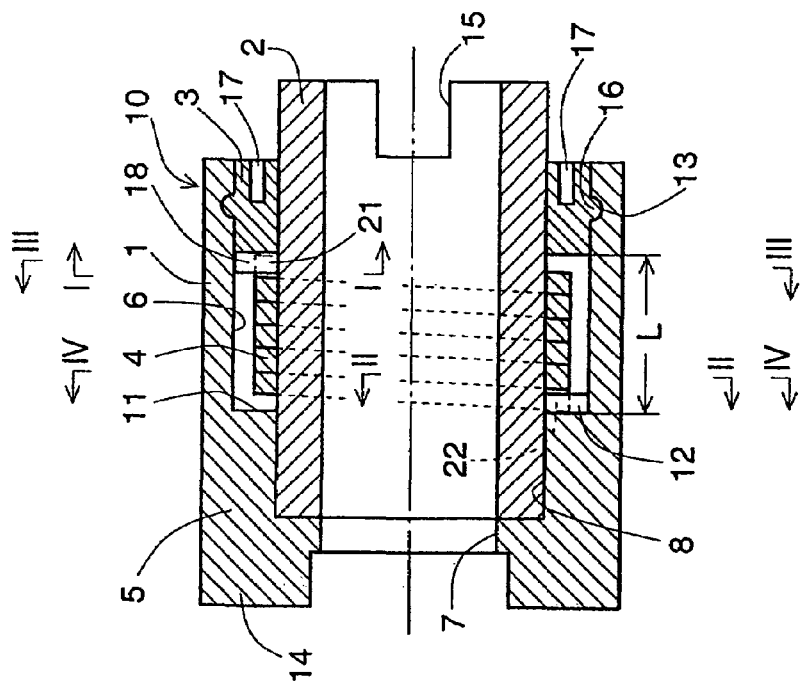
FIG. 1A is a sectional view of a torque limiter embodying the present invention.
Figure 1B:
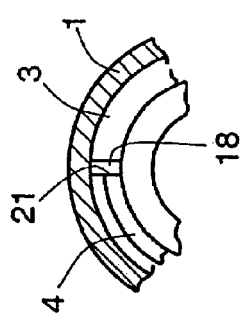
FIG. 1B is a sectional view taken along line I-I of FIG. 1A.
Figure 1D:
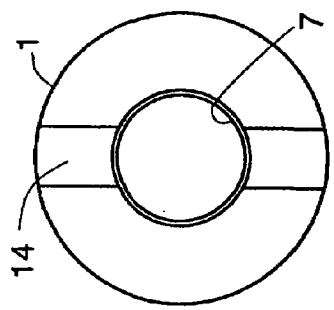
FIG. 1D is an end view of the torque limiter of FIG. 1A, as viewed from the left-hand side of FIG. 1A.
Figure 1C:
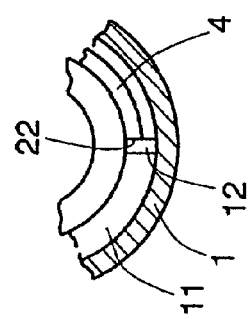
FIG. 1C is a sectional view taken along line II-II of FIG. 1A.
Figure 1E:
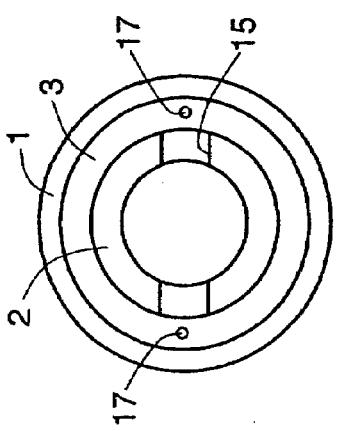
FIG. 1E is an end view of the torque limiter of FIG. 1A, as viewed from the right-hand side of FIG. 1A.

Now referring first to FIGS. 1A-1E and 2, the torque limiter embodying the present invention comprises an outer annular member 1, an inner ring 2, an annular lid member 3 and a coil spring 4. At a first end thereof, the annular outer member 1 has a boss portion 5 centrally defining a bore 7 through which a shaft extends. The annular outer member 1 is further formed with a radially inner surface 6 that extends from the axially inner end of the boss portion 5 to a second end of the annular outer member 1. The radially inner surface 6 has a diameter greater than the outer diameter of the coil spring 4 when the coil spring 4 is fitted on the inner ring 2. Axially inwardly of the bore 7, the boss portion 5 has a radially inner surface 8 having a greater diameter than the bore 7 for supporting the inner ring 2. As shown in FIGS. 1A and 1C, a protrusion 12 is formed on an axially inner end face 11 of the boss portion 5 (which is the shoulder formed between the radially inner surfaces 6 and 8). The protrusion 12 extends the entire radial dimension of the axially inner end face 11 of the boss portion 5, and has an axial dimension equal to or slightly smaller than the axial dimension of the cross-section of the wire forming the coil spring 4 if the wire has a square cross-section or the diameter of the cross-section of the wire if the wire has a circular cross-section. The annular outer member 1 is formed with a circumferential groove 13 in the radially inner surface 6 near the second end. At the first end, the annular outer member 2 has protrusions 14 adapted to engage e.g. a roller.

The inner ring 2 has a radially inner surface having a diameter equal to the diameter of the bore 7 and adapted to be arranged coaxial with the bore 7 when mounted in the annular outer member 1. In its unstressed state, the coil spring 4 has an inner diameter smaller than the diameter of the radially outer surface of the inner ring 2. Thus, the coil spring 4 is interference-fitted on the radially outer surface of the inner ring 2. The inner ring 2 has one end thereof rotatably supported by the radially inner surface 8 of the boss portion 5 with the other end protruding axially outwardly from the annular outer member 1. In the protruding end, the inner ring 2 is formed with a groove 15 adapted to engage a pin provided on a shaft (not shown).

The annular lid member 3 is formed with a rib 16 on its radially outer surface. The lid member 3 is fitted on the radially outer surface of the inner ring 2 with the rib 16 engaged in the circumferential groove 13 formed in the radially inner surface 6 of the annular outer member 1, thereby closing a gap between the radially inner surface of the annular outer member 1 and the radially outer surface of the inner ring 2 while rotatably supporting the inner ring 2. The lid member 3 is fairly rigidly secured to the annular outer member 1, but can be rotated relative to the annular outer member 1 by inserting a tool into a pair of holes 17 formed in the axially outer end face of the lid member 3. On the axially inner end face of the lid member 3, a protrusion 18 (see FIGS. 1A and 1B) is formed so as to extend the entire radial dimension of the axially inner end face of the lid member 3, and has an axial dimension equal to or slightly smaller than the axial dimension of the cross-section of the wire forming the coil spring 4 if the wire has a square cross-section or the diameter of the cross-section of the wire if the wire has a circular cross-section.

The coil spring 4 comprises a steel wire. The steel wire shown has a square cross-section but a steel wire having a circular cross-section may be used instead. The coil spring 4 has a common uniform diameter. The coil spring shown is right-hand wound, but a left-hand wound coil spring may be used instead. End faces 21 and 22 of the end portions of the coil spring 4 are substantially perpendicular to the axis of the wire forming the coil spring 4. The end portions of the coil spring 4 including their end faces 21 and 22 are bent neither axially nor radially. The circumferential positional relation between the end faces 21 and 22 is not particularly limited. But the distance L between the end faces 21 and 22 (see FIG. 1A) should be equal to the distance between axially inner end face 11 of the boss portion 5 and the axially inner surface of the lid member 3. Thus, when the lid member 3 is turned in the direction in which the coil spring 4 is wound by engaging a tool in the hole 17 formed in the lid member 3 with the annular outer member 1 and the inner ring 2 both fixed, the protrusion 18 of the lid member 3 will abut the end face 21 of the coil spring 4 (see FIG. 1B). Then, the coil spring 4 begins to turn together with the lid member 3 against the frictional force between the coil spring 4 and the inner ring 2. When the other end face 22 of the coil spring 4 abuts the protrusion 12 of the annular outer member 1, the lid member 3 is stopped. In this state, both end faces 21 and 22 of the coil spring 4 are pressed against the protrusions 12 and 18, respectively, with no circumferential gaps therebetween.

Now the operation of the torque limiter 10 is described.

Figure 3A:
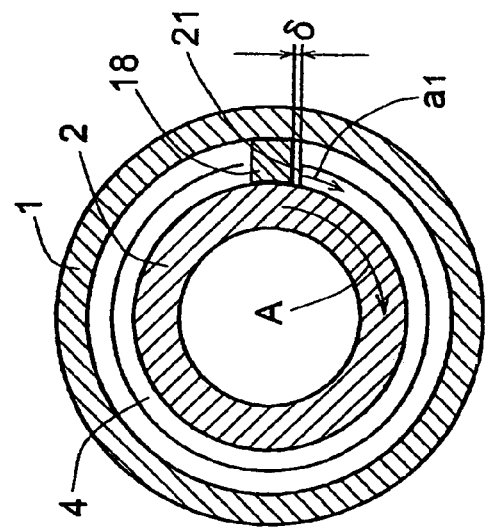
FIGS. 3A and 3B are sectional views taken along lines III-III and IV-IV of FIG. 1A, respectively.
Figure 3B:
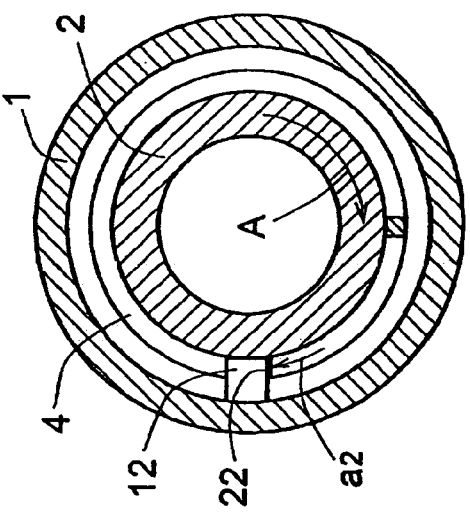

With the torque limiter 10 assembled as described above, when the inner ring 2 rotates relative to the annular outer member 1 in the direction in which the coil spring 4 is wound, i.e. in the clockwise direction in FIGS. 3A and 3B, the coil spring 4 will also rotate clockwise (as shown by the arrow A in FIGS. 3A and 3B), so that the end face 21 will separate from the protrusion 18 of the lid member 3 in the direction shown by the arrow a1 in FIG. 3A by a distance δ (FIG. 3A), while the end face 22 is pressed against the protrusion 12 of the annular outer member 1 as shown by arrow a2 in FIG. 3B. The coil spring 3 is thus slightly expanded radially, so that the turning resistance between the inner ring 2 and the coil spring 4 decreases to a predetermined level.

Figure 4A:
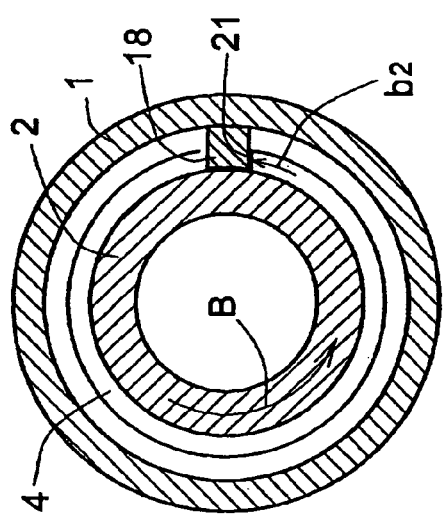
FIGS. 4A and 4B are sectional views taken along lines III-III and IV-IV of FIG. 1A, respectively.
Figure 4B:
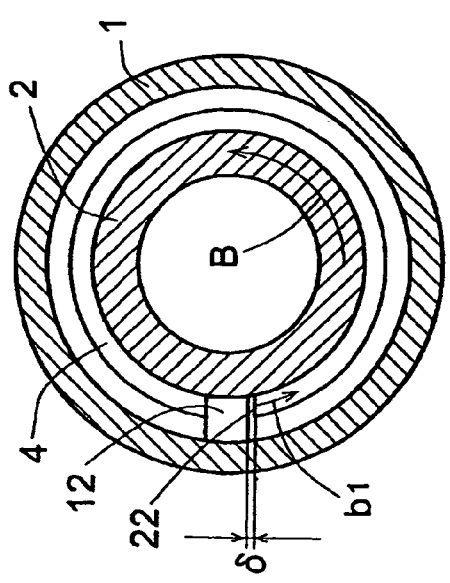

When the inner ring 2 rotates relative to the annular outer member 1 in the direction opposite to the direction in which the coil spring 4 is wound, i.e. in the counterclockwise direction in FIGS. 4A and 4B, the coil spring 4 will also rotate counterclockwise (as shown by the arrow B in FIG. 4A), so that the end face 22 will separate from the protrusion 12 of the annular outer member 1 in the direction shown by the arrow b1 in FIG. 4B by a distance δ (FIG. 4B), while the end face 21 is pressed against the protrusion 18 of the lid member 3 as shown by arrow b2 in FIG. 4A. The coil spring 3 is thus slightly expanded radially, so that the turning resistance between the inner ring 2 and the coil spring 4 decreases to a predetermined level.

Thus, irrespectively of in which direction the inner ring 2 rotates, the maximum torque that can be transmitted between the inner ring and the outer member is determined by the rotational resistance produced between the inner ring 2 and the coil spring 4. The torque limiter according to the invention thus serves as a two-way torque limiter.

Figure 5:
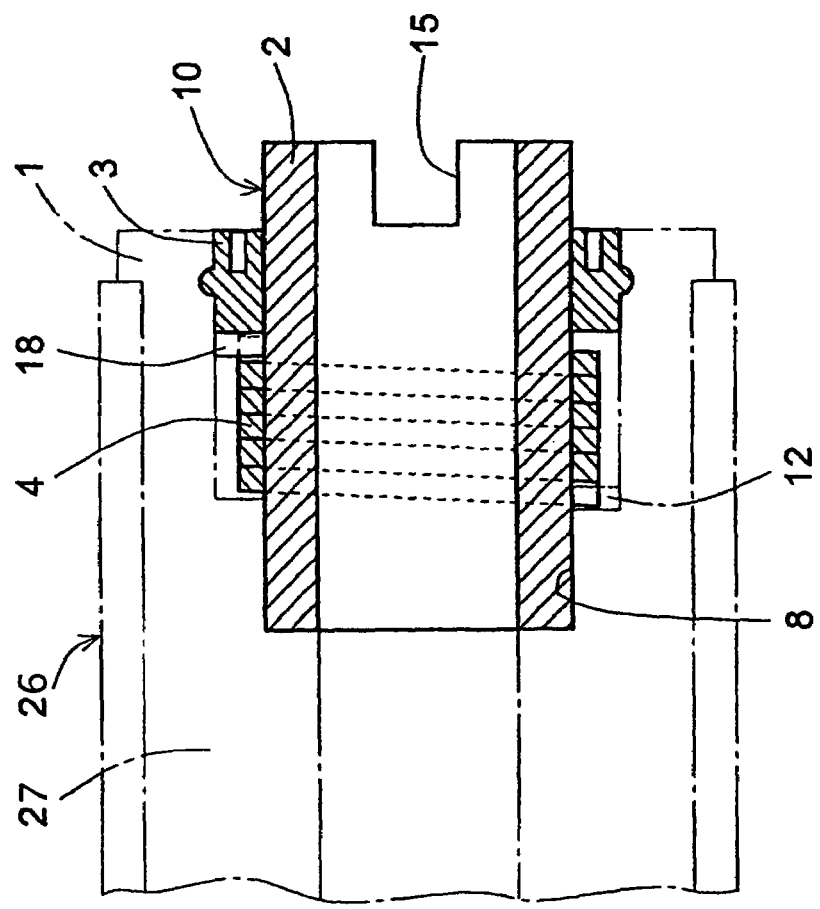
FIG. 5 is a sectional view of the torque limiter of FIG. 1A when in actual use.

FIG. 5 shows the torque limiter of the present invention, as mounted in a paper feed roller 26 of an office machine at one end thereof. The annular outer member 1 of the torque limiter is fixed to a roller body 27 of the paper feed roller 26.

Figure 2:
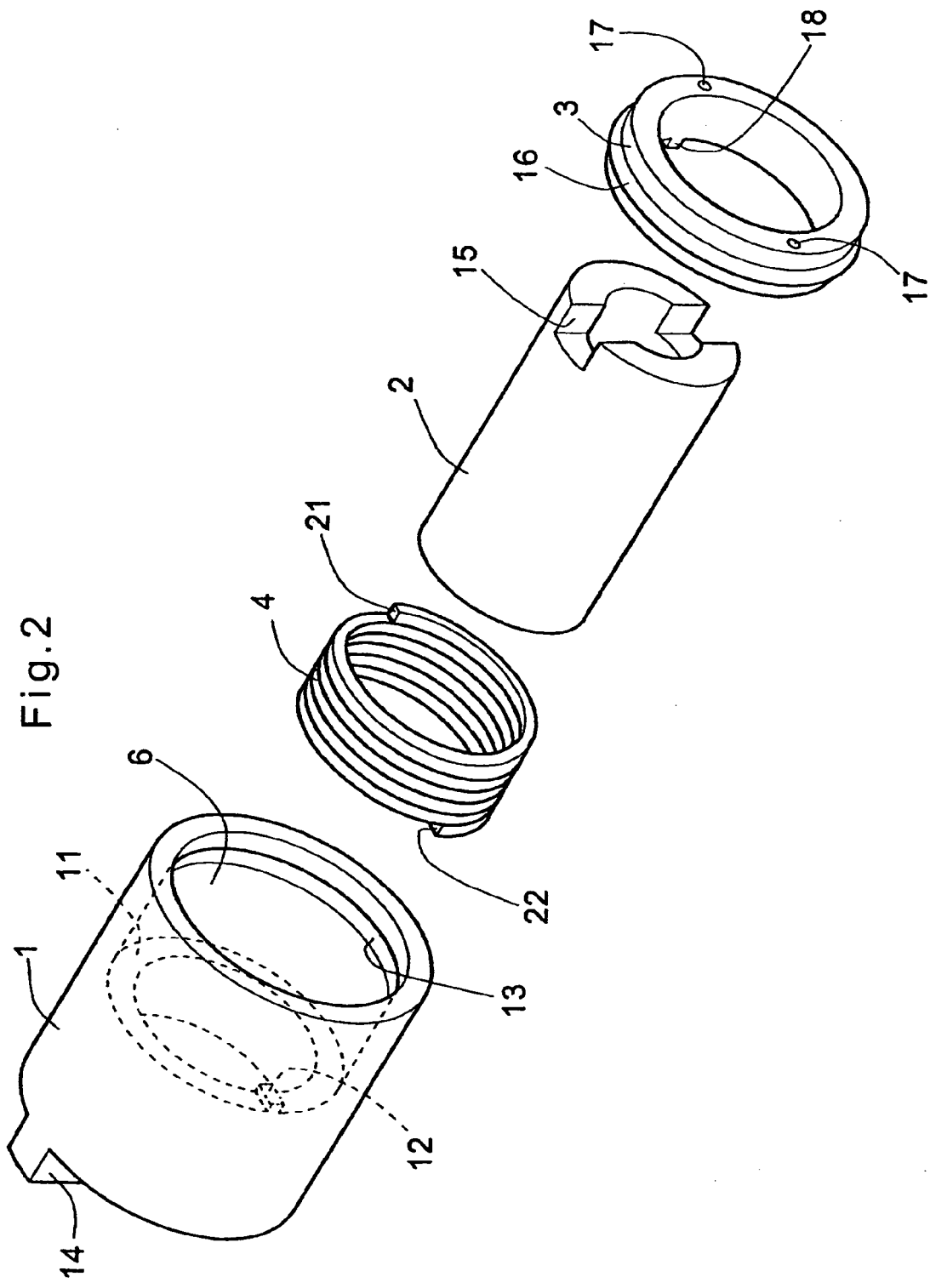
FIG. 2 is an exploded perspective view of the torque limiter of FIG. 1A.
Figure 6:
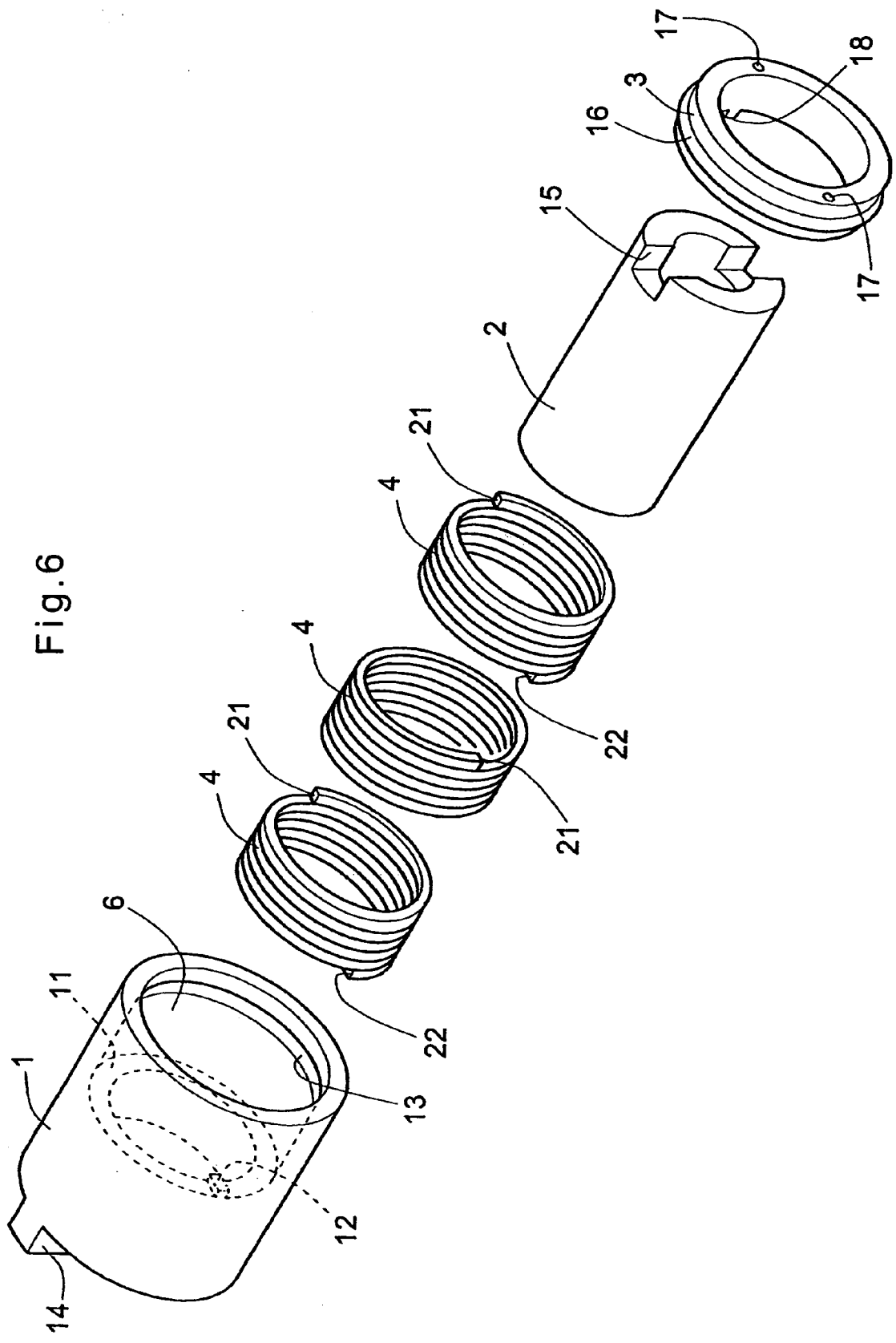
FIG. 6 is an exploded perspective view of another embodiment.

If greater maximum torque that can be transmitted between the inner ring and the outer member is needed, as shown in FIG. 6, a plurality of (three in FIG. 6) coil springs 4 similar to the coil spring 4 shown in FIG. 2 and equal in winding direction and diameter to each other are fitted on the inner ring 2 in series with each other, with the corresponding end faces 21 and 22 of the adjacent coil springs 4 in abutment with each other. The three coil springs thus act like a single spring. Otherwise, the embodiment of FIG. 6 is identical in structure and function to the embodiment of FIGS. 1 to 5.

Figure 7:
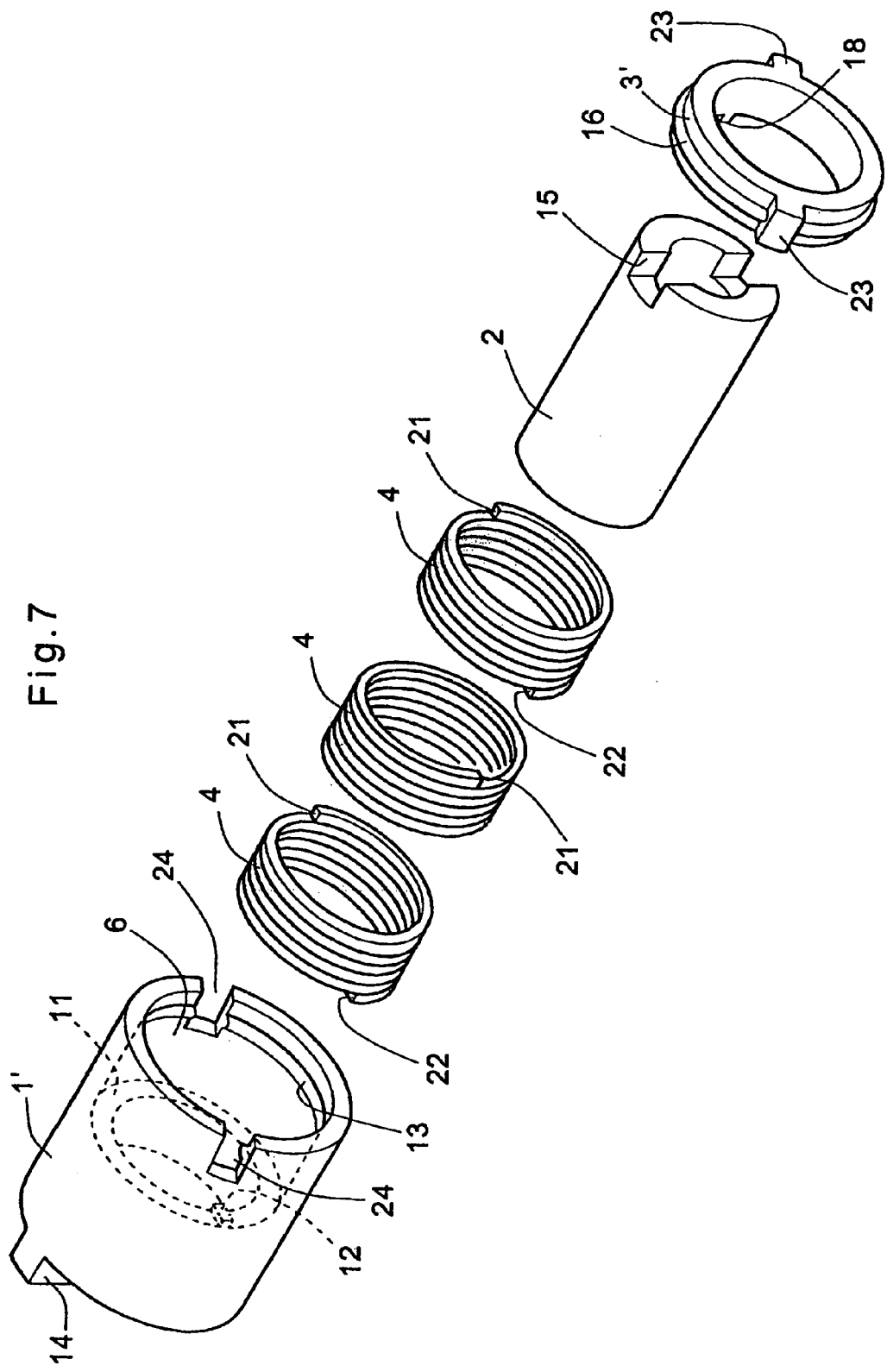
FIG. 7 is an exploded perspective view of still another embodiment.
Figure 8:
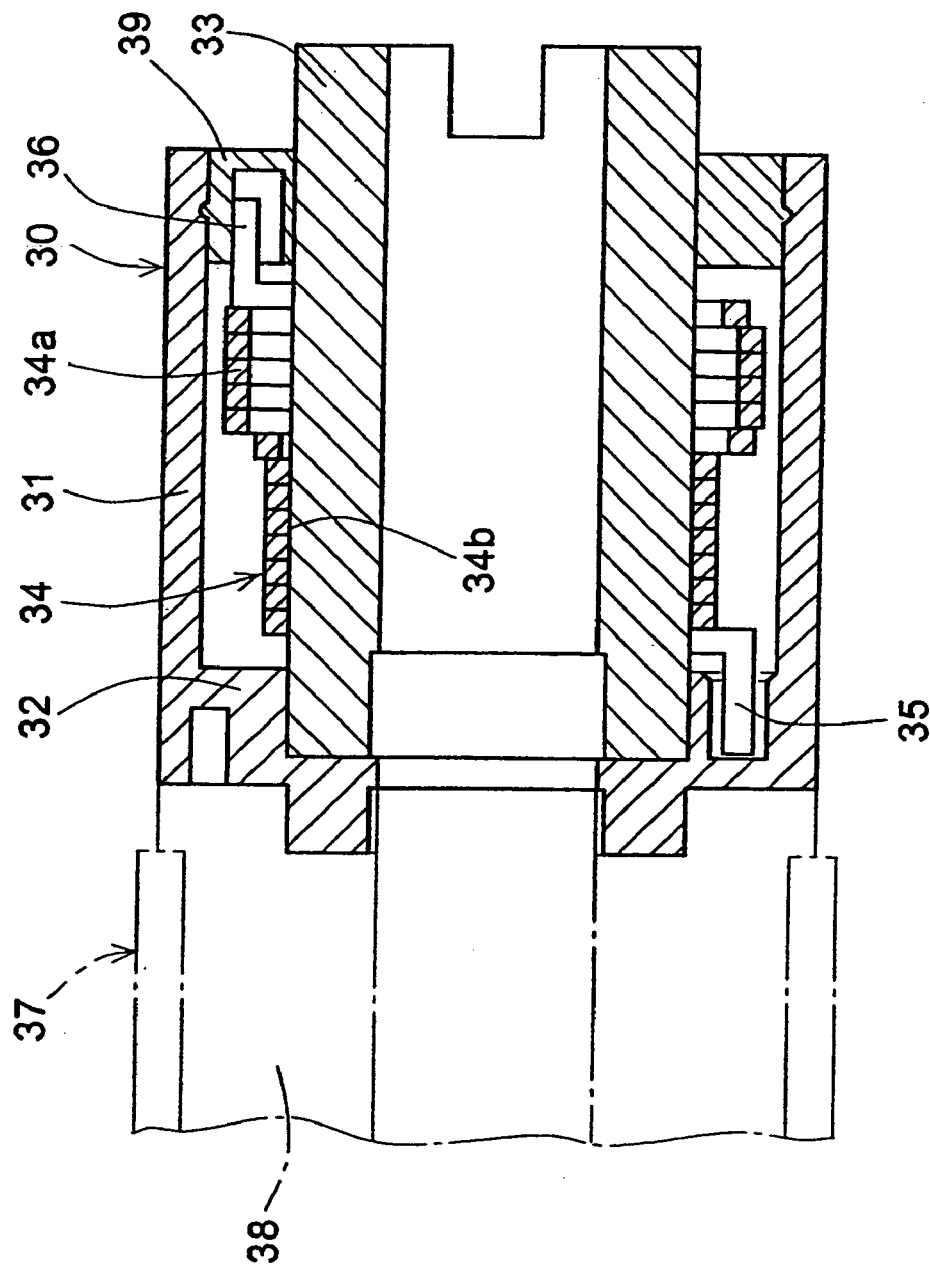
FIG. 8 is a sectional view of a conventional torque limiter.

In the embodiment of FIG. 7, instead of the pair of holes 17 in the embodiment of FIGS. 1 to 5, a pair of protrusions 23 are formed on the outer periphery of the lid member 3' so as to fit in cutouts 24 formed in the end face of the annular outer member at the second end thereof. The protrusions 23 and the cutouts 24 are positioned such that when the protrusions 23 fit in the cutouts 24, the protrusion 18 of the lid member 3' and the protrusion 12 of the annular outer member 1' circumferentially abut the end faces 21 and 22 of the coil spring or springs 4, respectively. With this arrangement, simply by engaging the protrusions 23 in the cutouts 24, the protrusions 12 and 18 circumferentially abut the end faces 21 and 22 of the coil spring or springs 4. Thus, there is no need to turn the lid member 3' to eliminate any circumferential gaps between the protrusions 12 and 18 and the end faces 21 and 22 of the coil spring or springs 4. Therefore, the torque limiter of this embodiment can be assembled more easily.

What is claimed is:

1. A torque limiter comprising:
   an annular outer member having a boss portion at a first end thereof;
   an inner ring inserted in said annular outer member and supported by said boss portion so as to be rotatable relative to said annular outer member;
   a coil spring having a uniform diameter and interference-fitted on a radially outer surface of said inner ring; and
   a lid member fitted in said annular outer member at a second end thereof, thereby closing a gap between said radially outer surface of said inner ring and a radially inner surface of said annular outer member, such that said lid member is rotatable relative to said inner ring;
   wherein said coil spring is constituted by a wire formed into a coil configuration, said wire has a wire axis extending longitudinally therealong, said wire has two wire end faces at opposite ends thereof, and said two wire end faces are substantially perpendicular to said wire axis at said opposite ends of said wire, respectively;
   wherein said boss portion has an axially inner end face formed with a first protrusion configured to engage one of said two wire end faces of said wire of said coil spring; and
   wherein said lid member has an axially inner surface formed with a second protrusion configured to engage the other of said two wire end faces of said wire of said coil spring.

2. A torque limiter comprising:
   an annular outer member having a boss portion at a first end thereof;
   an inner ring inserted in said annular outer member and supported by said boss portion so as to be rotatable relative to said annular outer member;
   a plurality of coil springs each having a uniform diameter, equal with each other in diameter and winding direction, and interference-fitted on a radially outer surface of said inner ring such that said coil springs are axially aligned with each other, and such that said plurality of coil springs includes first and second end coil springs at opposing first and second axial ends of said plurality of coil springs; and
   a lid member fitted in said annular outer member at a second end thereof, thereby closing a gap between said radially outer surface of said inner ring and a radially inner surface of said annular outer member, such that said lid member is rotatable relative to said inner ring;
   wherein, for each of said plurality of coil springs, said coil spring is constituted by a wire formed into a coil configuration, said wire has a wire axis extending longitudinally therealong, said wire has two wire end faces at opposite ends thereof, and said two wire end faces are substantially perpendicular to said wire axis at said opposite ends of said wire, respectively;

wherein said boss portion has an axially inner end face formed with a first wire-engagement protrusion;

wherein said lid member has an axially inner surface formed with a second wire-engagement protrusion;

wherein said wire end faces of said wire of said first end coil spring include, at said first axial end of said wire of said first end coil spring, an axially outer wire end face arranged to engage said first wire-engagement protrusion and, at said second axial end of said wire of said first end coil spring, an axially inner wire end face;

wherein said wire end faces of said wire of said second end coil spring include, at said first axial end of said wire of said second end coil spring, an axially outer wire end face arranged to engage said second wire-engagement protrusion and, at said second axial end of said wire of said second end coil spring, an axially inner wire end face; and wherein said wire end faces of said wires of said coil springs, other than said axially outer wire end faces of said wires of said first and second end coil springs, are each arranged to abut an adjacent one of said coil springs.

* * * * *